US010003635B1

(12) United States Patent
Seibert, Jr. et al.

(10) Patent No.: US 10,003,635 B1
(45) Date of Patent: Jun. 19, 2018

(54) SYSTEM AND METHOD FOR TRACKING EVENT OCCURRENCES BETWEEN APPLICATIONS

(71) Applicant: Google LLC, Mountain View, CA (US)

(72) Inventors: Jeffrey Hall Seibert, Jr., Cambridge, MA (US); Samuel A. Neubardt, Somerville, MA (US); Sam Robbins, Hudson, MA (US); Kyle J. Bolton, Cambridge, MA (US); Matthew Massicotte, Quincy, MA (US); Jamie Rothfeder, Watertown, MA (US); Ed Solovey, Brookline, MA (US); Marc Richards, Cambridge, MA (US); Andrea S. Falcone, Lexington, MA (US)

(73) Assignee: Google LLC, Mountain View, CA (US)

( * ) Notice: Subject to any disclaimer, the term of this patent is extended or adjusted under 35 U.S.C. 154(b) by 495 days.

(21) Appl. No.: 14/211,542

(22) Filed: Mar. 14, 2014

Related U.S. Application Data

(60) Provisional application No. 61/790,768, filed on Mar. 15, 2013.

(51) Int. Cl.
*G06F 9/44* (2018.01)
*H04L 29/08* (2006.01)

(52) U.S. Cl.
CPC ................... *H04L 67/10* (2013.01)

(58) Field of Classification Search
CPC .................... H04M 2203/554; H04L 51/38
USPC ............................................. 709/201
See application file for complete search history.

(56) References Cited

U.S. PATENT DOCUMENTS

| | | | | |
|---|---|---|---|---|
| 8,463,730 | B1 * | 6/2013 | Smith | H04L 63/20 706/48 |
| 2002/0095584 | A1 * | 7/2002 | Royer | H04L 63/0428 713/183 |
| 2005/0120216 | A1 * | 6/2005 | Lee | H04L 12/2807 713/171 |
| 2008/0155434 | A1 * | 6/2008 | Fischer | H04L 67/02 715/764 |
| 2010/0216434 | A1 * | 8/2010 | Marcellino | H04W 36/385 455/412.2 |
| 2010/0257540 | A1 * | 10/2010 | Schuler | G06F 9/542 719/313 |
| 2012/0260232 | A1 * | 10/2012 | Hirsch | G06F 8/20 717/107 |
| 2014/0188663 | A1 * | 7/2014 | Cancro | G06Q 30/0601 705/26.61 |
| 2014/0195582 | A1 * | 7/2014 | Sherwood | H04L 67/16 709/201 |
| 2018/0032997 | A1 * | 2/2018 | Gordon | G06Q 20/3224 |

* cited by examiner

*Primary Examiner* — Chris Parry
*Assistant Examiner* — Stephen Houlihan
(74) *Attorney, Agent, or Firm* — Fish & Richardson P.C.

(57) ABSTRACT

A system and method for tracking event occurrences among applications executing on a mobile device is provided. When an action is initiated, the first application generates a first notification indicator and records it with a notification server. When the action is performed by, for example, a second application, the second application generates a second notification indicator and registers it with the notification server. The notification server may then notify the first application or other entities of the occurrence of the action.

20 Claims, 4 Drawing Sheets

SYSTEM AND METHOD FOR TRACKING EVENT OCCURRENCES BETWEEN APPLICATIONS

CROSS-REFERENCE TO RELATED APPLICATIONS

This application claims priority under 35 U.S.C. § 119(e) to U.S. Provisional Patent Application Ser. No. 61/790,768, filed on Mar. 15, 2013 and entitled "System and Method For Tracking Event Occurrences Between Applications." U.S. Provisional Patent Application Ser. No. 61/790,768 is incorporated herein by reference in its entirety.

BACKGROUND OF THE INVENTION

Current operating systems for mobile devices, such as the iOS operating system available from Apple, Inc. typically do not include functionality for applications to communicate among each other. This limitation may be included within the operating system to improve stability and/or limit access to certain private information associated with particular applications executing on a mobile device. It is known in the art that applications may utilize hacks and/or flaws in the mobile device's operating system to achieve inter-application communication; however, these workarounds are not supported by the operating system and may cause undesirable effects on a mobile device. Further, certain workarounds may violate the terms of use of the operating system and/or the privacy policies of the operating system vendor.

One example of an environment where inter-application communication is desirous is in the field of determining whether an action or other event that was begun by a first application has been completed by a second application. For example, assume that the user is viewing tweets in a first application, such as the Twitter application (available from Twitter, Inc. of San Francisco, Calif.) executing on a mobile device, such as an iPhone. One of the tweets may include a hyperlink to a video viewable in a third party viewer. If the user clicks on the link, the Twitter application displays an information screen indicating that the viewer is not installed on the mobile device and asks if the user would like to install the viewer. If the user indicates that he desires to install the viewer, the twitter application will, e.g., launch the Apple App Store to enable the user to download and install the second application. However, the first application does not receive feedback as to whether the user has followed through to install the second application. Whether the user simply closes the App Store or actually downloads and installs the second application remains unknown to the first application.

SUMMARY OF THE INVENTION

The noted disadvantages of the prior art are overcome by providing a system and method for tracking event occurrences among applications executing on a mobile device. Applications comprise a notification module that is configured to register certain actions with a notification server over a network. Illustratively, a first application will register a desired action, for example, the installation of a second application with the notification server. The second application will register the fact that it was installed with the notification server. The notification server may then alert the first application of the completion of the action, i.e., the fact that the second application was installed. In alternative embodiments, the notification server may simply collect such data for internal tracking and/or to provide metrics to application developers.

In operation, when a first application executing on a mobile device initiates an action that it desires follow through information, the first application generates a first notification identifier associated with the action or event. Illustratively, the first notification identifier comprises of a hash value generated using a cryptographically strong hash of a set of information associated with the action or event to be performed. For example, the set of information may comprise a numeric identifier of the mobile device and a numeric identifier of the second application to be installed. Illustratively, the first notification identifier is generated so that no information relating to the user is discernable from the notification identifier, i.e., anonymity is provided via the hash function. The first notification identifier is then registered with the notification server, which stores the first notification identifier in an entry of a notification database or other data container. At a later point in time, the second application may perform the desired action, such as initially launching after being installed. In response to performing the action, the second application is configured to generate a second notification identifier. The second notification identifier is generated using the same technique as the first notification identifier, e.g., hashing a set of information associated with the action or event. Thus, the second notification identifier will be equal to the first notification identifier. In this way, both notification identifiers provide no information regarding the user who is executing the application(s). The second application then registers the second notification identifier with the notification server.

When the notification server receives the second notification indicator, it determines whether any previous notification has been registered with a value equal to the second notification identifier. By doing so, the notification server will locate the entry associated with the first notification identifier, i.e. the hash value that was registered by the first application. The notification server may then send alerts to those applications that have subscribed to such notifications. Thus, in an illustrative embodiment, the first application may receive a notification from the notification server that the event for which it was tracking has occurred. In alternative embodiments, the notification server may generate certain metrics to be forwarded to application developers for tracking purposes.

BRIEF DESCRIPTION OF THE DRAWINGS

The above and further advantages of the invention may be better understood by referring to the following description in conjunction with the accompanying drawings in which like reference the numerals indicate identical or functionally similar elements.

DETAILED DESCRIPTION OF AN ILLUSTRATIVE EMBODIMENT

Figure 1:
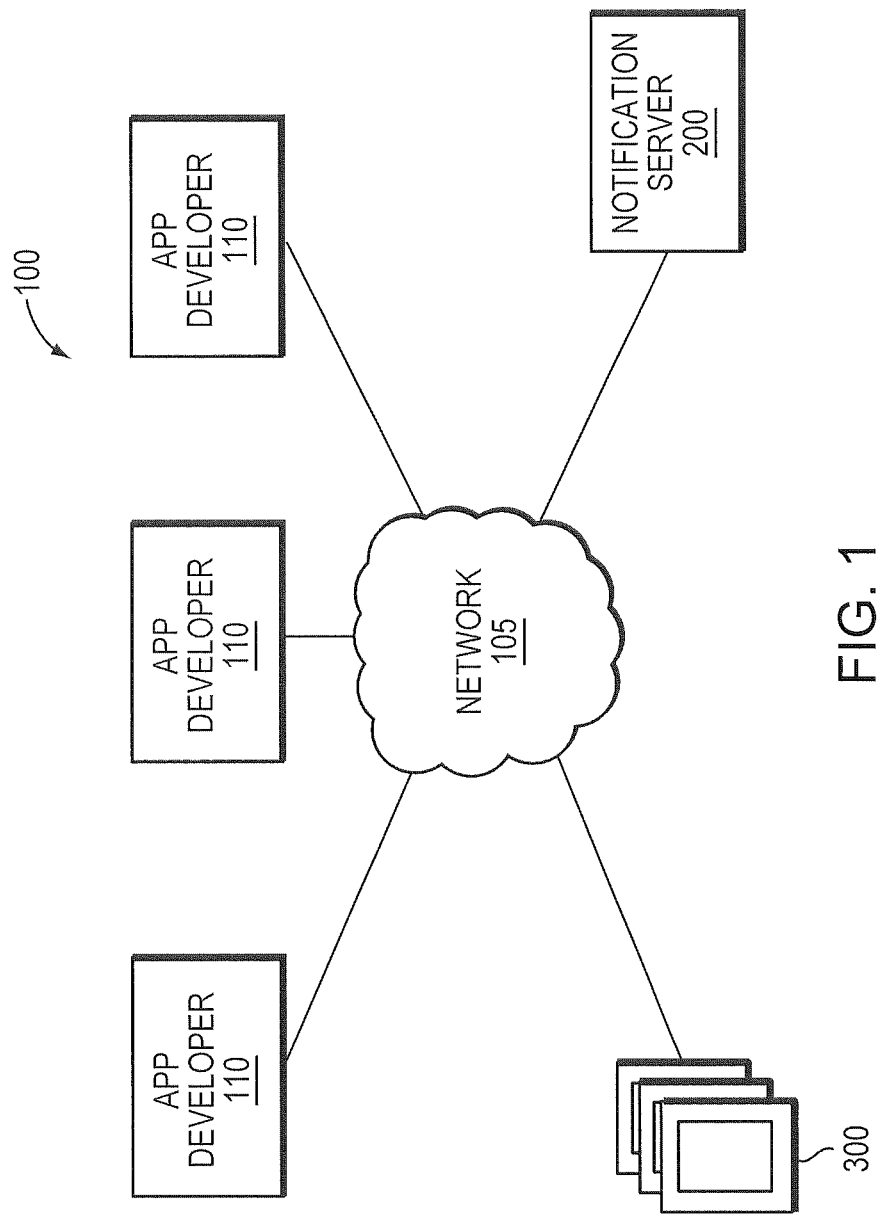
FIG. 1 is a schematic block diagram of an exemplary network environment in which the principles of the present invention may be implemented in accordance with an illustrative embodiment of the present invention.

FIG. 1 is a schematic block diagram of an exemplary network environment 100 in which the principles of the present invention may be utilized for tracking event occurrences in accordance with an illustrative embodiment of the present invention. The environment 100 is centered around a network 105 that may comprise any conventional form of networking including, for example, a TCP/IP network, and virtual private network (VPN), a local area network (LAN) or a wide area network (WAN), such as the well-known Internet. As will be appreciated by those skilled in the art, network 105 may comprise a plurality of different networks (not shown). It should be noted that the various networks may comprise different types and/or utilize differing protocols in accordance with alternative embodiments of the present nation. Portions of network 105 may comprise different types of networks, such as wireless networks, wireless networks, cellular networks, etc. in accordance with alternative embodiments of the present invention. As such, the description of network 105 comprising a single network should be taken as exemplary only.

Operatively connected to the network 105 are a plurality of application developer systems 110. Illustratively, the application developer systems 110 represent systems associated with entities that develop and distribute applications for use on mobile devices, such as smart phones, tablet computers, etc. Application developer system 110 may comprise a server that collects data and/or other metrics that may be forwarded from notification server 200, described further below. In an illustrative embodiment, developer systems 110 may subscribe to notifications of event occurrences with the notification server 200.

Also operatively interconnected with the network 105 is a notification server 200, described further below in reference to FIG. 2, that implements notification features in accordance with an illustrative embodiment of the present invention. Also operative interconnected with the network 105 are one or more mobile devices 300, described further below in reference to FIG. 3. Illustratively, mobile device 300 executes one or more applications that may desire to track event occurrences that occur.

Figure 2:
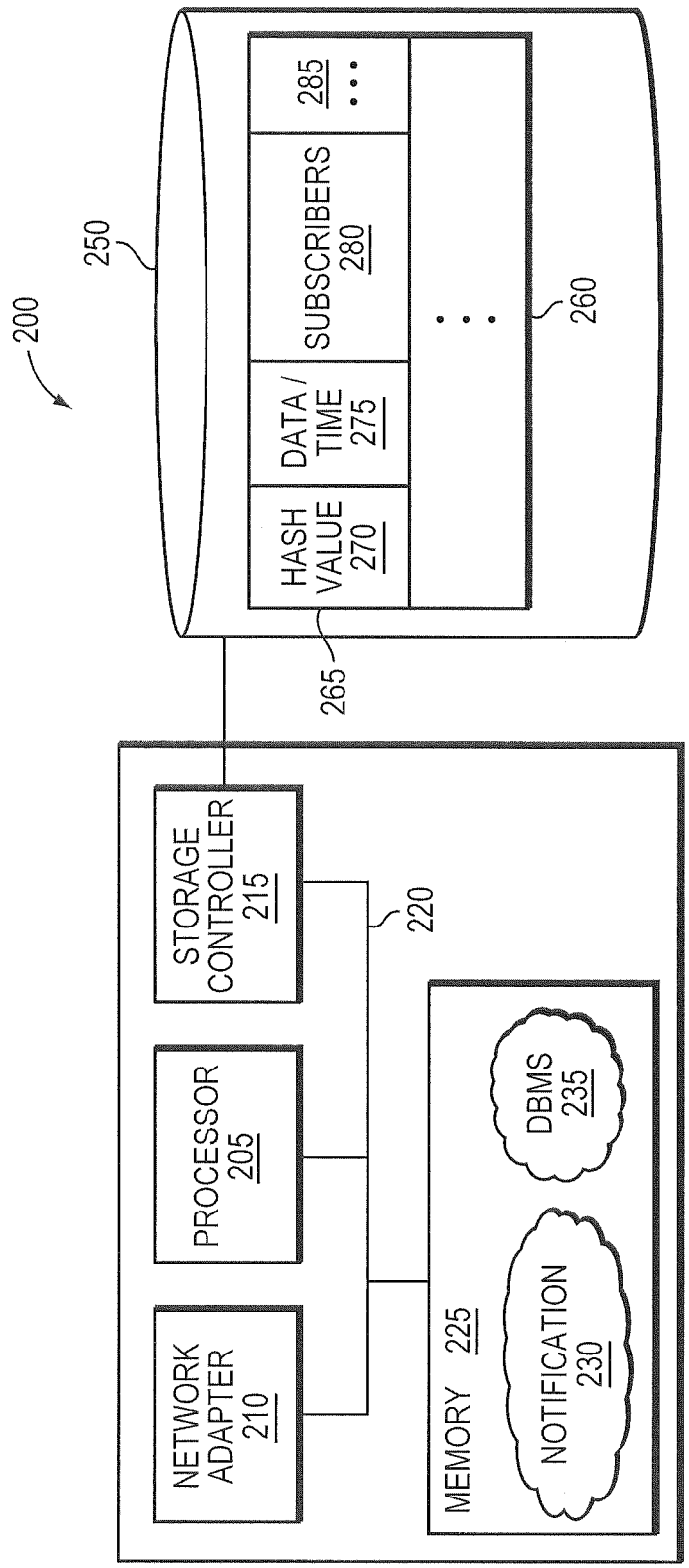
FIG. 2 is a schematic block diagram of an exemplary notification server in accordance with an illustrative embodiment of the present invention.

FIG. 2 is a schematic block diagram of an exemplary notification server 200 in accordance with an illustrative embodiment of the present invention. The notification server 200 illustratively comprises a processor 205, network adapter 210, storage controller 215 and memory 225 operatively interconnected by a network bus 220. The processor 205 typically comprises the necessary elements and/or logic adapted and configured to execute software programs and manipulate data structures in accordance with an illustrative embodiment of the present invention. While one processor 205 is shown and described in relation to FIG. 2, as will be appreciated by those skilled in the art, a plurality of processors 205 may be utilized to improve performance. Similarly, it should be noted that the description contained herein of the notification server 200 comprising a single server should be taken as exemplary only. In accordance with alternative embodiments of the present invention, the functionality of the notification server 200 may be distributed among a plurality of servers in a clustered configuration and/or may be distributed among a cloud-based server and/or storage environment.

The network adapter 210 illustratively contains the mechanical, electrical, and signaling circuitry for enabling communication of data over links coupled to the network 105. The network adapter 210 may be configured to transmit and/or receive data using a variety of different protocols including, inter alia, TCP/IP, UDP, ATM, asynchronous optical networks (SONET), wireless protocols, Frame Relay, Ethernet, fiber distributed data interface (FDDI), etc. Notably, the physical network adapter 210 may be used to implement one or more network interfaces, such as for a virtual private network (VPN) access, as will be known to those skilled in the art. It should be noted that in the illustrative embodiment described herein, a single network adapter 210 is shown and described operatively interconnecting the notification server 200 to the network 105. However, it should be noted that in alternative embodiments, a plurality of network adapters 210 may be utilized to communicate with the network 105. As will be appreciated by those skilled in the art, a variety of network topologies may be utilized to implement the principles of the present invention. As such, the description of the network adapter 210 operatively interconnecting the notification server 200 with network 105 should be taken as exemplary only.

The memory 240 stores a plurality of processes including, for example, a notification process 230 and a database management system (DBMS) process 235. In accordance with an illustrative embodiment of the present invention, the notification process 230 manages the receipt of notification identifiers from applications installed on mobile devices. Further, the notification process 230 may transmit alerts to applications and/or application developer systems 110 that have registered an interest in certain notifications. The notification process 230 works in conjunction with the illustrative DBMS process 235 to maintain a notification database 260 in accordance with an illustrative embodiment of the present invention.

In operation, the notification process 230 receives notification identifiers from applications and, in conjunction with the DBMS process 235, stores those notifications in the notification database 260. Further, should the notification process 230 identify that a notification identifier that is being registered is identical to a previously stored notification identifier, the notification process 230 will alert the application (or other entity) of the matching notification identifier.

The storage controller 220 manages access to storage 250 associated with the notification server 200 in accordance with an illustrative embodiment of the present invention. The storage 250 may comprise a plurality of disk drives arranged in a fault tolerant array. However, it should be noted that in alternative embodiments, storage 250 may comprise any form of persistent media including, for example, flash RAM, tape, rewritable optical media, etc. Furthermore, the storage 250 may be distributed in a cloud based environment with redundancy and fault tolerance features. For example, the servers may be arranged in RAID arrays to enable recovery from the failure of one or more of the storage devices. In an alternative embodiment, the storage 250 may be replicated or mirrored at one or more locations to enable near immediate access to data stored thereon in the event of a failure of one of the plexes of the mirror.

Within the storage 250 is an exemplary notification database 260 that is managed by the DBMS process 235 in accordance with an illustrative embodiment of the present invention. The DBMS process 235 implements the database as a relational database; however, in accordance with alternative embodiments of the present invention the database 260 may be implemented in different formats. As such, the description of a relational database 260 should be taken as exemplary only. It should be noted that in accordance with alternative embodiments of the present invention, a non-database structure may be utilized to store information relating to notifications; as such, the description of DBMS process 235 and database 260 should be taken as exemplary only.

The database 260 illustratively comprises of a plurality of entries 265. Each entry 265 is illustratively associated with a particular notification registered with the notification server 200. Each entry illustratively comprises a hash value field 270, a date/time field 275, a subscribers field 280 and, in alternative embodiments, additional fields 285. The hash value field 270 illustratively stores the notification identifiers, i.e., hash values generated by applications. The date/time field 275 illustratively stores the date and time that the notification identifier was registered with the notification server 200. The subscribers field 280 illustratively comprises a list of applications and/or application developer systems 110 that have registered an interest in receiving an alert when a matching event is registered. That is, the field 280 contains a list of entities that desire to be notified when another event is registered with an identical hash value (notification identifier).

In accordance with an illustrative embodiment of the present invention, when an application registers a notification identifier, the notification process, working in conjunction with the DBMS process, creates a new entry 265 and stores the notification identifier in the hash value field 270. The notification process 230 further checks the database 260 to identify if any other entries 260 contain an identical notification identifier to that received. Should the newly received notification identifier be identical to a previously stored notification identifier, then the newly received notification identifier represents a second application completing an action that was initiated by a first application. In such a situation, the notification process 230 may alert those entities registered as subscribers in the subscribers field 280 of entry 260.

Figure 3:
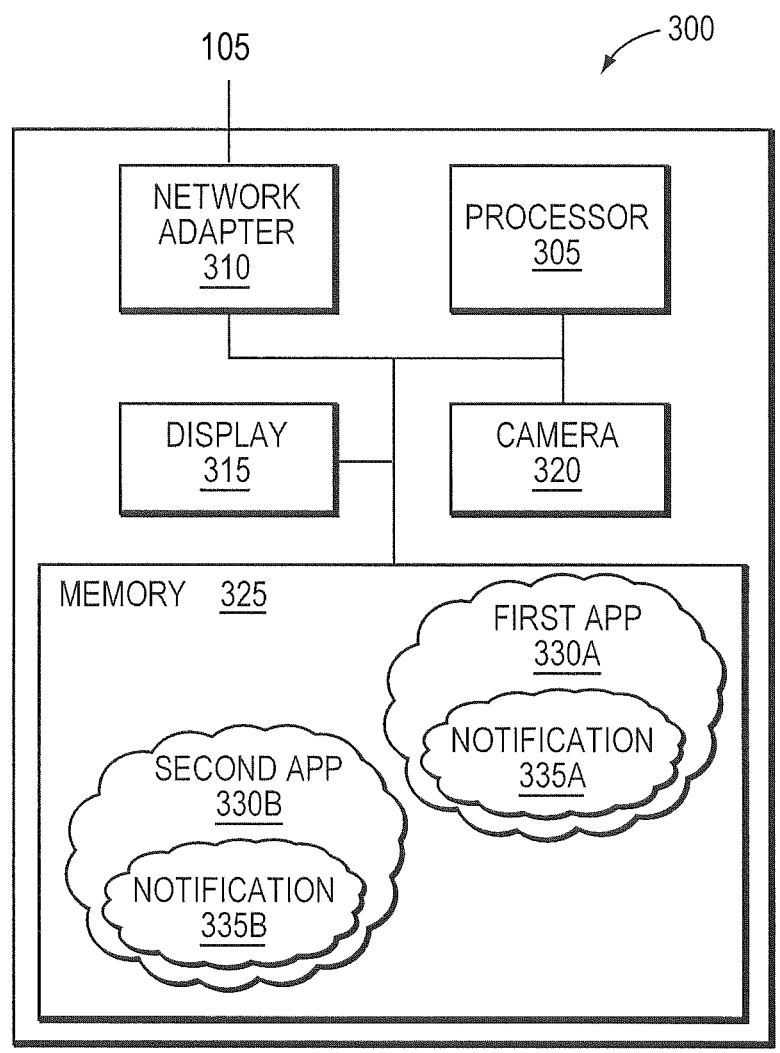
FIG. 3 is a schematic block diagram of an exemplary mobile device that may be utilized in accordance with an illustrative embodiment of the present invention.

FIG. 3 is a schematic block diagram of an exemplary mobile device 300 that may be utilized in accordance with an illustrative embodiment of the present invention. The mobile device 300 illustratively comprises a processor 305, a network adapter 310, a display 315, a camera 320, and a memory 325. Illustrative, the processor executes software contained within the memory 325. The network adapter 310 provides an interface to network 105. Illustratively, the network adapter may function over a cellular network and/or wireless networks. As will be appreciated by those skilled in the art, a plurality of network adapters 310 may be required on the mobile device 300 to effectively operate over a plurality of different network types. As such, the description of a single network adapter 310 may be taken as exemplary only. The display 315 illustratively comprises a touch screen that is utilized both to display of information to a user as well as an input device. It should be noted that in alternative embodiments where the display does not comprise input functionality, the mobile device 300 may require an alternative input device, such as a keyboard (not show). The camera 320 provides the functionality to acquire images by the mobile device 300.

Within the memory 325 is an exemplary first application 330A and an exemplary second application 330B that are executed by the processor 305. Exemplary first application 330A includes a notification module 335A that is configured to register a first notification identifier with the notification server 200 in accordance with an illustrative embodiment of the present invention. As described further below, in reference to FIG. 4, application 330A may utilize the notification module 335A to generate a hash value associated with a particular event that the application desires to track the occurrence thereof. At a later point in time, the second application 330B may complete the desired action and, in response, the notification module 335B will generate a second notification identifier and register it with the notification server 200.

Figure 4:
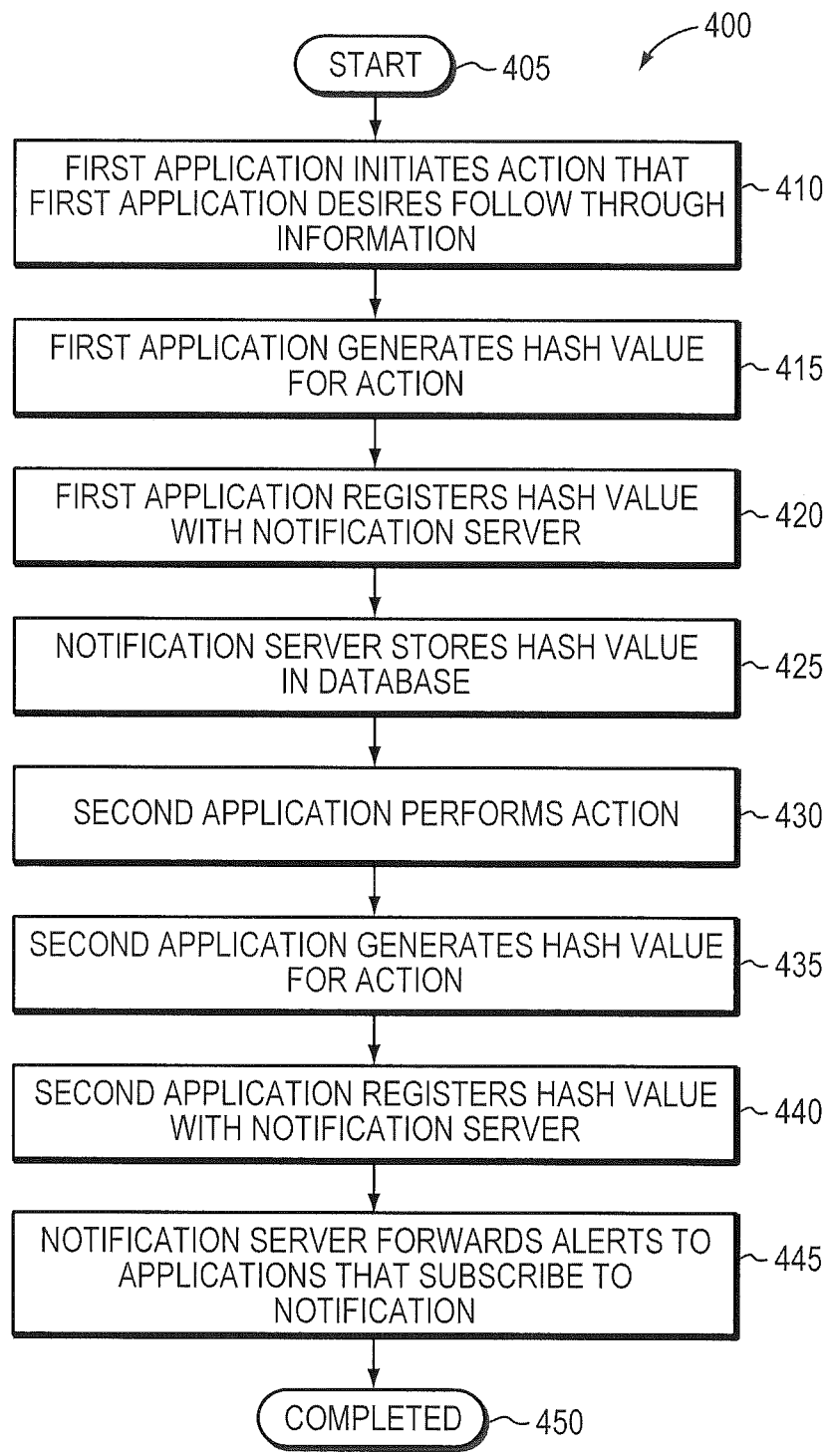
FIG. 4 is a flowchart detailing the steps of a procedure for tracking event occurrences between applications executing on a mobile device in accordance with an illustrative embodiment of the present invention.

FIG. 4 is a flowchart detailing the steps of a procedure 400 for tracking event occurrences among a plurality of applications in accordance with an illustrative embodiment of the present invention. The procedure 400 begins in step 405 and continues to step 410 where a first application 330A executing on a mobile device 300 initiates an action for which the application desires follow through information. This may comprise, e.g., an application directing a user to an application store to download a second application.

Thus, in an illustrative embodiment, the first application may redirect a user to a website or other application to enable the download of necessary software (e.g., a second application) to further a desired outcome. As will be appreciated by those skilled in the art, it may be advantageous for the first application to know whether the desired event has occurred.

Once the first application initiates the action, the procedure continues to step 415 where the first application generates a hash value associated with the action. Illustratively, the hash value, which serves as a first notification identifier, is generated using a strong cryptographic hash algorithm, such as the exemplary and well-known secure hash algorithm (SHA-1). Illustratively, the hash algorithm utilizes a plurality of pieces of information as input. In accordance with an illustrative embodiment of the present invention, the first application utilizes an identifier of the device and an identifier of the desired action as inputs to the hash algorithm. However, it should be noted that in accordance with alternative embodiments of the present invention, additional and/or different information may be utilized as input to the hash algorithm. As such, the description of utilizing a device identifier and an action to be taken as inputs to the hash function should be taken as exemplary only. By utilizing a cryptographically strong hash function, the notification identifier does not provide any information relating to the user. That is, the device identifier or any other personal information that is sued as inputs to the hash function may not be determined based on the generated hash value. This enables the notification server to correlate a user with matching events, i.e., the first notification identifier and the second notification identifier associated with a particular action; however, the notification identifiers may not be utilized to track a particular user across different actions and/or event types. This provides a degree of privacy for users and works to ensure that the principles of the present invention comply with application developers' privacy policies.

Once the first identifier, i.e., the hash value has been generated, the first application then registers the hash value with the notification server 200 in step 420. This may be performed by, for example, the first application transmitting, via the network 105, a message to the notification server containing the generated hash value. In accordance with an alternative embodiment of the present invention, the first application may also indicate that it is desirous of receiving a notification when the desired action or event occurs, that is when another application registers a second notification identifier that is identical to first notification identifier. In response to receiving the registration request, the notification server stores the hash value in the notification database 260 in step 425.

At some later point in time, the second application performs the desired action in step 430. For example, the user may install the second application and then launch the second application. It should be noted that in alternative embodiments of the present invention, the desired event may never occur. In such embodiments, the first application will never received notification of the event occurring. Once the second application performs the action, the second application then, in step 435, generates a second notification identifier associated with action. Illustratively, the second notification identifier comprises of a hash value generated identically to the first notification identifier.

Once the second application generates the hash value, it then registers the hash value with the notification server in step 440. This may be accomplished by, e.g., the second application sending a message via network 105 to the notification server 200 to register the second notification identifier. In response to receiving the second notification identifier, the notification server scans its database and determines whether a matching notification identifier has been previously received. If so, the notification server forwards appropriate alerts to applications that have subscribed to the notification in step 445. The procedure 400 and then completes in step 450.

As will be appreciated by those skilled in the art, the principles fo the present invention may be utilized in a variety of environments. One exemplary use case is to track the installation of a second application that was suggested by a first application. For example, a user may be using the Twitter application on an end user device. The user receives a tweet that includes a Twitter Card for installing an application. As will be appreciated by those skilled in the art, a Twitter Card is a protocol for enabling actions within a tweet, e.g., a photo card, a gallery card, an app card, an app install card, etc. In response to the application install Twitter Card being displayed, the user selects an install application option by, e.g., clicking on an "Install App" button. In response, the Twitter app generates a token, i.e., a first notification identifier, that is illustratively in the format of SHA1(<shared secret token><device id><target app identifier>) and registers the token with the notification server. Further, in response to the user clicking on the install application button, the desired application is downloaded and installed on the end user's device.

After the installation of the new application on the end user device, the user launches the application. Upon being initialized for the first time, the application generates a token, i.e., a second notification identifier, in the format of SHA1(<shared secret token><device id><current app identifier>) and forwards it to the notification server. Assuming that the same SDK is utilized in both the Twitter and new applications, the shared secret will be identical and the two tokens (notification identifiers) will match. Upon detecting the match, the notification server will alert the Twitter application that a matching notification identifier has been recorded at the notification server.

The foregoing description has been directed to specific embodiments. It will be apparent; however, that other variations and modifications may be made to the described embodiments, with the attainment of some or all of their advantages. For instance, it is expressly contemplated that the components and/or elements described herein can be implemented as software encoded on one or more tangible (non-transitory) computer-readable storage media (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for tracking event occurrences between applications, the method comprising:
   obtaining, by a first application executed by one or more processors of a mobile device, (i) an identifier of the mobile device and (ii) an identifier of an action to be performed by a second application executed by the one or more processors of the mobile device;
   generating, by the first application executed by the one or more processors of the mobile device and based at least on (i) the identifier of the mobile device and (ii) the identifier of the action to be performed by the second application executed by the one or more processors of the mobile device, a first notification identifier;
   transmitting the first notification identifier from the mobile device to a notification server over a computer network to request a notification indicating that the second application has performed the action;
   performing, by the second application executed by the one or more processors of the mobile device, the action;
   obtaining, by the second application executed by the one or more processors of the mobile device, (i) the identifier of the mobile device and (ii) an identifier of the action performed by the second application executed by the one or more processors of the mobile device;
   generating, by the second application and based at least on (i) the identifier of the mobile device and (ii) the identifier of the action performed by the second application executed by the one or more processors of the mobile device, a second notification identifier in response to the second application performing the action;
   transmitting the second notification identifier from the mobile device to the notification server over the computer network; and
   receiving an alert, from the notification server and by the first application, that the second application performed the action if the second notification identifier generated by the second application based at least on (i) the identifier of the mobile device and (ii) the identifier of the action performed by the second application matches the first notification identifier generated by the first application based at least on (i) the identifier of the mobile device and (ii) the identifier of the action to be performed by the second application.

2. The method of claim 1 wherein a first value of the first notification identifier being equal to a second value of the second notification identifier indicates that the first notification identifier matches the second notification identifier.

3. The method of claim 1 wherein the first notification identifier and the second notification identifier comprise hash values.

4. The method of claim 3 wherein the hash values are generated using a SHA-1 algorithm.

5. The method of claim 1 wherein the action is installation of the second application on the mobile device.

6. The method of claim 1, wherein generating the first notification identifier comprises:

providing, by the first application, the identifier of the mobile device, the identifier of the action to be performed by the second application executed by the one or more processors of the mobile device, and an identifier of the second application as inputs to a hash function; and obtaining an output of the hash function as the first notification identifier.

7. The method of claim 1, wherein generating the second notification identifier comprises:

providing, by the second application, the identifier of the mobile device, the identifier of the action to be performed by the second application executed by the one or more processors of the mobile device, and an identifier of the second application as inputs to a hash function; and obtaining an output of the hash function as the second notification identifier.

8. The method of claim 1, wherein:

obtaining, by the first application executed by one or more processors of the mobile device, (i) the identifier of the mobile device and (ii) the identifier of the action to be performed by the second application executed by the one or more processors of the mobile device is in response to determining, by the first application, a user request to begin installation of the second application has been received.

9. A system comprising:

one or more computers and one or more storage devices storing instructions that are operable, when executed by the one or more computers, to cause the one or more computers to perform operations for tracking event occurrences between applications, the operations comprising:

obtaining, by a first application executed by one or more processors of a mobile device, (i) an identifier of the mobile device and (ii) an identifier of an action to be performed by a second application executed by the one or more processors of the mobile device;

generating, by the first application executed by the one or more processors of the mobile device and based at least on (i) the identifier of the mobile device and (ii) the identifier of the action to be performed by the second application executed by the one or more processors of the mobile device, a first notification identifier;

transmitting the first notification identifier from the mobile device to a notification server over a computer network to request a notification indicating that the second application has performed the action;

performing, by the second application executed by the one or more processors of the mobile device, the action;

obtaining, by the second application executed by the one or more processors of the mobile device, (i) the identifier of the mobile device and (ii) an identifier of the action performed by the second application executed by the one or more processors of the mobile device;

generating, by the second application and based at least on (i) the identifier of the mobile device and (ii) the identifier of the action performed by the second application executed by the one or more processors of the mobile device, a second notification identifier in response to the second application performing the action;

transmitting the second notification identifier from the mobile device to the notification server over the computer network; and receiving an alert, from the notification server and by the first application, that the second application performed the action if the second notification identifier generated by the second application based at least on (i) the identifier of the mobile device and (ii) the identifier of the action performed by the second application matches the first notification identifier generated by the first application based at least on (i) the identifier of the mobile device and (ii) the identifier of the action to be performed by the second application.

10. The system of claim 9 wherein a first value of the first notification identifier being equal to a second value of the second notification identifier indicates that the first notification identifier matches the second notification identifier.

11. The system of claim 9 wherein the first notification identifier and the second notification identifier comprise hash values.

12. The system of claim 11 wherein the hash values are generated using a SHA-1 algorithm.

13. The system of claim 9 wherein the action is installation of the second application on the mobile device.

14. The system of claim 9, wherein generating the first notification identifier comprises:

providing, by the first application, the identifier of the mobile device, the identifier of the action to be performed by the second application executed by the one or more processors of the mobile device, and an identifier of the second application as inputs to a hash function; and obtaining an output of the hash function as the first notification identifier.

15. The system of claim 9, wherein generating the second notification identifier comprises:

providing, by the second application, the identifier of the mobile device, the identifier of the action to be performed by the second application executed by the one or more processors of the mobile device, and an identifier of the second application as inputs to a hash function; and obtaining an output of the hash function as the second notification identifier.

16. The system of claim 9, wherein:

obtaining, by the first application executed by one or more processors of the mobile device, (i) the identifier of the mobile device and (ii) the identifier of the action to be performed by the second application executed by the one or more processors of the mobile device is in response to determining, by the first application, a user request to begin installation of the second application has been received.

17. A non-transitory computer-readable medium storing software comprising instructions executable by one or more computers which, upon such execution, cause the one or more computers to perform operations for tracking event occurrences between applications, the operations comprising:

obtaining, by a first application executed by one or more processors of a mobile device, (i) an identifier of the mobile device and (ii) an identifier of an action to be performed by a second application executed by the one or more processors of the mobile device;

generating, by the first application executed by the one or more processors of the mobile device and based at least on (i) the identifier of the mobile device and (ii) the identifier of the action to be performed by the second application executed by the one or more processors of the mobile device, a first notification identifier;

transmitting the first notification identifier from the mobile device to a notification server over a computer network to request a notification indicating that the second application has performed the action;

performing, by the second application executed by the one or more processors of the mobile device, the action;

obtaining, by the second application executed by the one or more processors of the mobile device, (i) the identifier of the mobile device and (ii) an identifier of the action performed by the second application executed by the one or more processors of the mobile device;

generating, by the second application and based at least on (i) the identifier of the mobile device and (ii) the identifier of the action performed by the second application executed by the one or more processors of the mobile device, a second notification identifier in response to the second application performing the action;

transmitting the second notification identifier from the mobile device to the notification server over the computer network; and receiving an alert, from the notification server and by the first application, that the second application performed the action if the second notification identifier generated by the second application based at least on (i) the identifier of the mobile device and (ii) the identifier of the action performed by the second application matches the first notification identifier generated by the first application based at least on (i) the identifier of the mobile device and (ii) the identifier of the action to be performed by the second application.

18. The medium of claim 17, wherein generating the first notification identifier comprises:

providing, by the first application, the identifier of the mobile device, the identifier of the action to be performed by the second application executed by the one or more processors of the mobile device, and an identifier of the second application as inputs to a hash function; and obtaining an output of the hash function as the first notification identifier.

19. The medium of claim 17, wherein generating the second notification identifier comprises:

providing, by the second application, the identifier of the mobile device, the identifier of the action to be performed by the second application executed by the one or more processors of the mobile device, and an identifier of the second application as inputs to a hash function; and obtaining an output of the hash function as the second notification identifier.

20. The medium of claim 17, wherein:

obtaining, by the first application executed by one or more processors of the mobile device, (i) the identifier of the mobile device and (ii) the identifier of the action to be performed by the second application executed by the one or more processors of the mobile device is in response to determining, by the first application, a user request to begin installation of the second application has been received.

* * * * *